United States Patent [19]
Kato et al.

[11] Patent Number: 4,824,191
[45] Date of Patent: Apr. 25, 1989

[54] OPTICAL PICKUP

[75] Inventors: Masayuki Kato, Atsugi; Fumio Yamagishi, Ebina; Shin-ya Hasegawa, Machida; Hiroyuki Ikeda, Yokohama; Takefumi Inagaki, Kawasaki, all of Japan

[73] Assignee: Fujitsu Limited, Kawasaki, Japan

[21] Appl. No.: 173,050

[22] Filed: Mar. 28, 1988

Related U.S. Application Data

[63] Continuation of Ser. No. 839,554, Mar. 14, 1986, abandoned.

[30] Foreign Application Priority Data

| Mar. 20, 1985 | [JP] | Japan | 60-057456 |
| Nov. 20, 1985 | [JP] | Japan | 60-260317 |
| Jan. 10, 1986 | [JP] | Japan | 61-003337 |

[51] Int. Cl.$^4$ ............................................. G02B 5/32
[52] U.S. Cl. ................................. 350/3.72; 350/401; 365/216; 369/45
[58] Field of Search ............... 350/3.72, 3.78, 3.7, 350/395, 401; 369/44, 45, 103; 365/121, 125, 215, 216

[56] References Cited

U.S. PATENT DOCUMENTS

| 3,773,401 | 11/1973 | Douklias et al. | 350/3.78 |
| 4,005,394 | 1/1977 | Kiemle | 350/3.78 |
| 4,312,559 | 1/1982 | Kojima et al. | 350/3.72 |
| 4,393,126 | 7/1983 | Kojima et al. | 350/3.72 |
| 4,488,042 | 12/1984 | Clay et al. | 350/3.72 |
| 4,497,534 | 2/1985 | Sincerbox | 350/3.72 |

OTHER PUBLICATIONS

Collier et al, *Optical Holography*, Academic Press, New York (1971), pp. 12-22, (Collection of Gau 257).

*Primary Examiner*—Bruce Y. Arnold
*Assistant Examiner*—Martin Lerner
*Attorney, Agent, or Firm*—Staas & Halsey

[57] ABSTRACT

An optical pickup for reading out information from an information recording media, such as an optical diskette, comprises a light source for irradiating light beam onto an optical diskette, an optical sensor for detecting the light beam reflected at the optical diskette, and an optical system including a wave plate and two hologram lenses. The first hologram lens diffracts the light beam from the light source, and the second hologram lens transmits the same light beam. On the other hand, the second hologram lens diffracts the reflected light beam from the optical diskette toward the optical sensor, and the first hologram lens transmits the same reflected light beam.

11 Claims, 15 Drawing Sheets

OPTICAL PICKUP

This is a continuation of application Ser. No. 839,554 filed on Mar. 14, 1986, now abandoned.

BACKGROUND OF THE INVENTION

1. Field of the Invention

This invention relates to an optical pickup for reading out information from an information recorded media, such as an optical diskette, and more particularly, to an optical pickup not including a conventional glass lens, but including light and compact-sized hologram lens.

2. Description of the Related Art

An optical pickup P, known in the prior art, includes, as seen from FIG. 24, an optical system comprising a semiconductor laser source 1, a collimator lens 2, a prism pair 3, a prism splitter 4, a ($\frac{1}{4}\cdot\lambda$) wave plate 5, an objective lens 6, a focussing lens 7, and an optical sensor 8, and these elements constitute a single unit. As seen from FIG. 25, the access to the above-mentioned conventional optical pickup is carried out by a linear motor LM with respect to an optical diskette D which is rotated by a motor M.

However, according to the conventional optical pickup, the principal elements constituting the optical system are made of glass or the like. Therefore, in order to ensure a required quality or capacity, the system is necessarily heavy and large in size. In a typical example, the pickup is at least several deca grams in weight, even if efforts have been made to reduce the weight thereof.

Therefore, a light and compact-sized pickup has long been desired in this field of the art, since it is very important to reduce the access time to an information storage media, such as an optical diskette capable of storing large quantities of information, and the access time depends on the speed of pickup when moved by the above-mentioned linear motor LM, which speed in turn depends largely on the weight of the pickup.

SUMMARY OF THE INVENTION

It is an object of the present invention to provide an optical pickup including light and compact-sized hologram lens.

It is another object of the present invention to provide an optical pickup capable of reducing the access time to an optical diskette.

According to the present invention, there is provided an optical pickup comprising a light source for irradiating a light beam onto an information recording media, such as an optical diskette, an optical sensor for detecting the light beam reflected by the information recording media, and an optical lens system including a wave plate through which the light beam passes, characterized in that the optical lens system further comprises: a first hologram lens; a second hologram lens arranged in parallel to the first hologram lens; the first and second hologram lens and the wave plate being arranged in such a manner that the light beam irradiated from the light source passes through the first and second holograms, in turn, and the wave plate, is reflected at the information recording media, and the reflected light beam again passes through the wave plate and the second and first holograms, in turn; one of the first and second hologram lens diffracting the light beam from the light source toward the information recording media, and the other hologram transmitting the same light beam; and the other hologram lens diffracting the reflected light beam from the information recording media toward the optical sensor, and one of the hologram lens transmitting the same reflected light beam.

In accordance with the present invention, the light beam travelling toward the optical sensor is separated from the incident light beam irradiated from the light source owing to the functions of diffraction and transmission exercised by the first and second hologram lens. Therefore, an optical pickup including light and compact-sized hologram lens can be obtained, which enables a reduction in the access time to the optical diskette.

BRIEF DESCRIPTION OF THE DRAWINGS

FIGS. 19A, 19B, 19C, 19D and 19E are schematic illustrations of a third embodiment of the objective hologram lens, wherein FIGS. 19A, 19B, and 19E are perspective views, and FIGS. 19C and 19D are elevational views;

DESCRIPTION OF THE PREFERRED EMBODIMENTS

Figure 1:
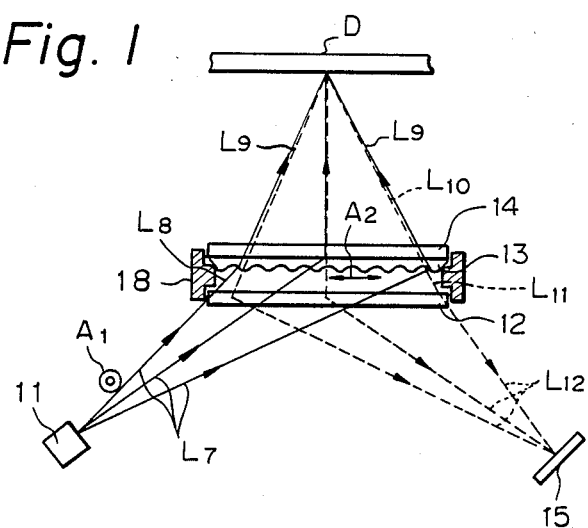
FIG. 1 is a schematic illustration of an optical system according to the present invention.

Referring now to FIG. 1, there is shown an embodiment of an optical system, according to the present invention, in which the optical system comprises a semiconductor laser source 11, a phase hologram 12, a surface relief hologram 13, a ($\frac{1}{4}\cdot\lambda$) wave plate 14, and an optical sensor 15.

Figure 2A:
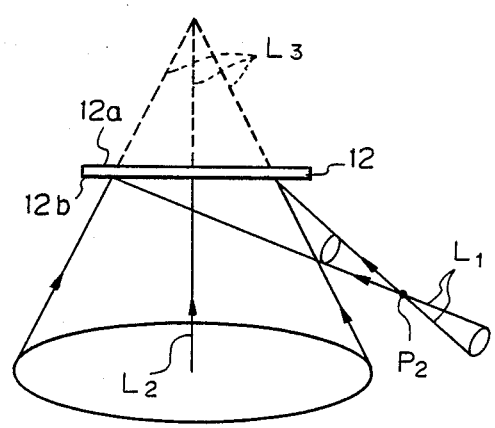
FIGS. 2A and 2B are schematic illustrations of steps for constructing a phase hologram and a surface relief hologram, respectively, in the embodiment shown in FIG. 1.

The phase hologram 12 is made of a photosensitive material, such as silver halide, dichromated gelatin, or photopolymer, and is so constructed, as seen from FIG. 2A, that a hologram construction light beam $L_1$ diverging from a point $P_2$ and a converging hologram construction light beam $L_2$ are irradiated onto the above-mentioned photosensitive material.

Figure 3A:
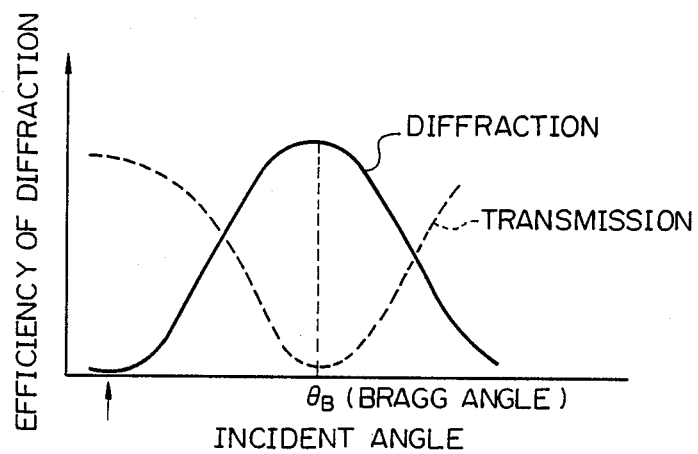
FIGS. 3A and 3B are diagrams showing the characteristics of incident angle of a phase hologram and the characteristics of polarization of a surface relief hologram, respectively.

The phase hologram 12 thus constructed has an incident angle characteristic as shown in FIG. 3A. Apparently, the diffraction efficiency of the phase hologram 12 depends largely on the incident angle of the reconstruction light beam. If a light beam is irradiated to the lower surface 12b of the phase hologram 12 in FIG. 2A, an incident angle of the light beam, which is in the same direction as the hologram construction light beam $L_1$, is a so called Bragg angle $\theta_B$, at which the diffraction efficiency becomes maximum, so that the radiated light beam is diffracted to the direction along an extended line $L_3$ of the hologram construction light beam $L_2$, as shown by a broken line in FIG. 2A. On the contrary, if a light beam is irradiated to the upper surface 12a of the phase hologram 12, an incident angle of the light beam, which is the same direction as the above-mentioned extended line $L_3$, is the Bragg angle $\theta_B$, at which the diffraction efficiency becomes maximum, so that the radiated light beam is diffracted in the direction along the hologram construction light beam $L_1$. On the other hand, if a light beam is irradiated at an angle largely different from the above-mentioned Bragg angle, such as an angle which is at least 20 to 30 degrees away from the above-mentioned Bragg angle, hereinafter referred to as "non-Bragg angle", the diffraction efficiency becomes much lower, so that almost all of the incident light beam is transmitted through the phase hologram 12.

Figure 2B:
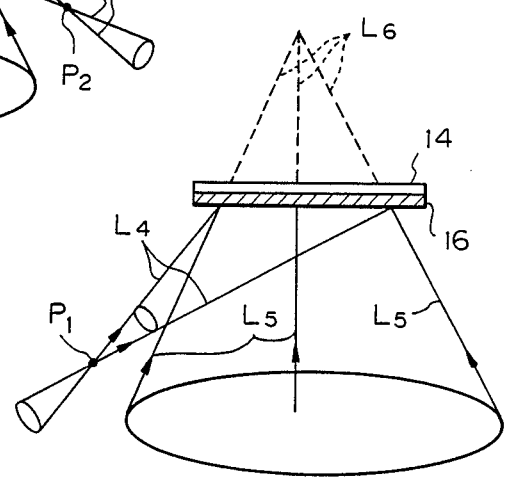

The surface relief hologram 13 shown in FIG. 1 comprises, as seen from FIG. 2B, a ($\frac{1}{4}\cdot\lambda$) wave plate 14 which serves as a substrate, and a coating material, such as photoresist 16, coated on the wave plate 14, onto which a hologram construction light beam $L_4$ diverging from a point $P_1$ and a converging hologram construction light beam $L_5$ are irradiated. In addition, a plurality of parallel relief grooves directed in one direction are formed on the coated surface. In this embodiment, because of the wave plate 14 is used as a substrate, the process for forming holograms is simplified.

Figure 3B:
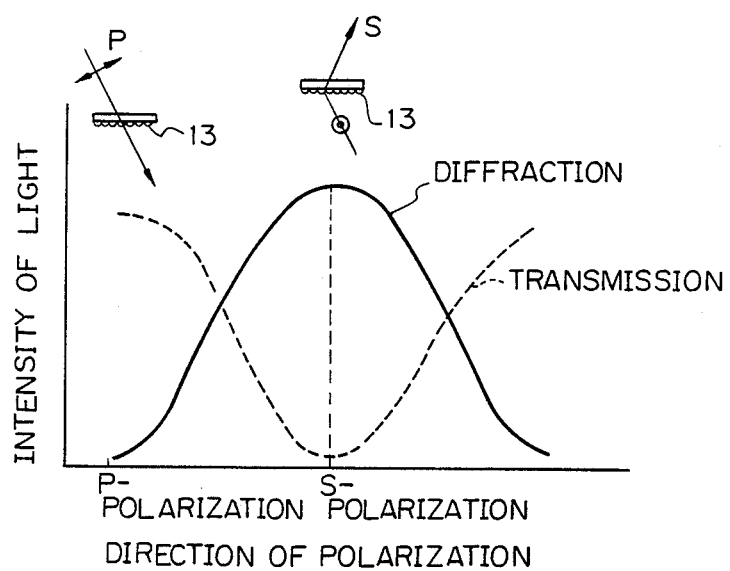

The surface relief hologram 13 thus constructed has a polarization characteristic as shown in FIG. 3B. As seen from FIG. 3B, the intensity of a diffracted light beam by this surface relief hologram 13 depends largely upon the direction of polarization of the incident light beam. That is to say, if the direction of the relief grooves is the same as that of the polarization, so-called "S-polarization", the intensity of the diffracted light beam becomes maximum, in which an incident light beam from the same direction as the hologram construction light beam $L_4$ in FIG. 2B is diffracted along an extended line $L_6$ of the hologram construction light beam $L_5$, as shown by a broken line in FIG. 2B. On the other hand, if the direction of the diffracted incident light beam is perpendicular to the direction of the relief grooves, so-called "P-polarization", the intensity of the diffracted light beam becomes minimum, so that almost all of the incident light beam is transmitted through the surface relief hologram 13.

In this embodiment, a semiconductor laser source 11 is arranged at a position in which an incident light beam $L_7$ therefrom is irradiated to the phase hologram 12 at the non-Bragg angle. On the other hand, the position of laser source 11 corresponds to the focal point $P_1$ of the hologram construction light beam $L_4$ with respect to the surface relief hologram 13. In addition, the direction $A_1$ of polarization of the above incident light beam $L_7$ from the semiconductor laser 11 is the same as the direction of the relief grooves of the surface relief hologram 13. (The direction $A_1$ is perpendicular to the sheet plane of FIG. 1.) On the other hand, the optical sensor 15 is located at a position corresponding to the focal point $P_2$ of the hologram construction light beam $L_1$. The hologram 12 and 13 are spaced by a suitable spacer 18 so as to be parallel and adjacent to each other.

The operation of light beam in the above embodiment will now be described.

In FIG. 1, a light beam $L_7$ from the semiconductor laser source 11 is irradiated to the phase hologram 12 at the non-Bragg angle, so that almost all of the incident light beam is transmitted therethrough. The transmitted light beam $L_8$ is irradiated to the surface relief hologram 13, but is then diffracted since the direction ($A_1$) of the polarization is the same as that of the relief grooves. The diffracted light beam $L_9$ is focussed via the wave plate 14 on the optical diskette D. The diffracted light beam $L_9$ passed through the wave plate 14 has been converted from a linearly polarized light to a circularly polarized light.

The light beam $L_{10}$ reflected at the optical diskette D and carrying the read out information is a circularly polarized light, which is the same as the above-mentioned diffracted light beam $L_9$. However, it is converted again to a linearly polarized light when it passes through the wave plate 14, and then is irradiated onto the surface relief hologram 13. However, the direction $A_2$ of the polarization of this incident light beam is parallel to the plane of the sheet of FIG. 1, which is perpendicular to the above direction $A_1$. Since the direction $A_2$ is perpendicular to the direction of the relief grooves of the surface relief hologram 13, almost all of the incident light beam is transmitted therethrough and the transmitted light beam $L_{11}$ is irradiated to the phase hologram 12 at the Bragg angle, as mentioned above. Therefore, the transmitted light beam $L_{11}$ is diffracted and the light beam $L_{12}$ thus diffracted is introduced into the optical sensor 15.

Figure 4:
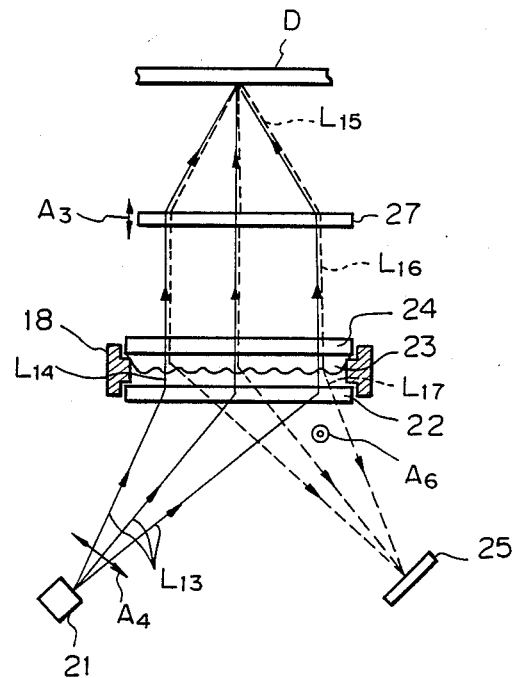
FIG. 4 is a schematic illustration of a second embodiment of an optical system according to the present invention.

FIG. 4 shows another embodiment of an optical system according to the present invention, in which the optical system comprises, in the same manner as FIG. 1, a semiconductor laser source 21, a phase hologram 22, a surface relief hologram 23, a ($\frac{1}{4}\cdot\lambda$) wave plate 24, and an optical sensor 25. In addition, this second embodiment comprises an objective hologram lens 27, which is arranged movably in the direction $A_3$ as well as in the direction perpendicular thereto, so that focussing and tracking the light beam is desirably effected on the optical diskette D by moving the objective hologram lens 27.

Figure 5A:
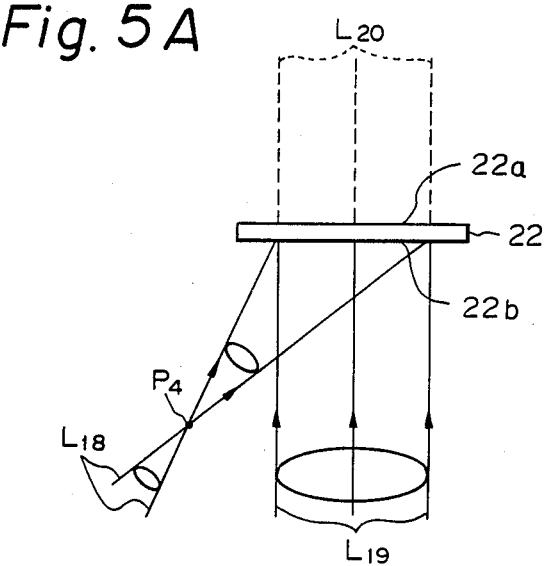
FIGS. 5A and 5B are schematic illustrations of steps for constructing a phase hologram and a surface relief hologram, respectively, in the embodiment shown in FIG. 4.

The phase hologram 22 is made of photosensitive material, in the same manner as the above embodiment, in which a hologram construction light beam $L_{18}$ (FIG. 5A) diverging from a point $P_4$ and a parallel hologram construction light beam $L_{19}$ are irradiated onto the photosensitive material. The phase hologram 22 thus constructed has a characteristic such that, if a light beam is irradiated onto the lower surface 22b of the phase hologram 22 in FIG. 5A, and if an incident angle of the light beam is in the same direction as the hologram construction light beam $L_{18}$ (the Bragg angle), the light beam is diffracted as an extended line $L_{20}$, as shown by a broken line in FIG. 5A. On the contrary, if a light beam is irradiated onto the upper surface 22a, and if an incident angle of the light beam is in the same direction as the line $L_{20}$ (the Bragg angle), the light beam is diffracted to the direction of the hologram construction light beam $L_{18}$. On the other hand, if a light beam is irradiated at the non-Bragg angle, almost all of the incident light beam is transmitted through the phase hologram 22.

The surface relief hologram 23 is constructed in the same manner as for the above embodiment, in which a photoresist 26 (FIG. 5B) is coated on the wave plate 24, to which a hologram construction light beam $L_{21}$ diverging from a point $P_3$ and a parallel hologram construction light beam $L_{22}$ are irradiated. In addition, a plurality of parallel relief grooves directed in one direction are formed on the coated surface.

Figure 5B:
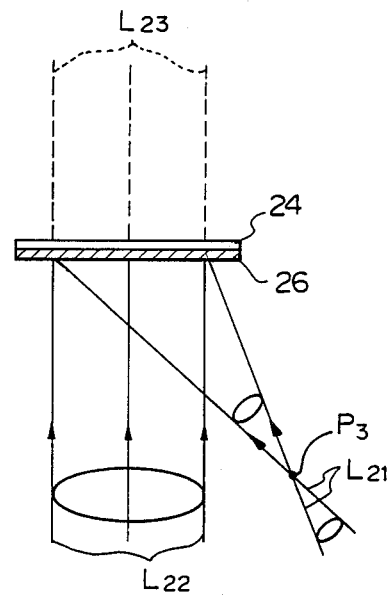

The surface relief hologram 23 thus constructed has a polarization characteristic such that if the direction of the relief grooves is the same as that of the polarization, so-called S-polarization, the intensity of the diffracted light beam becomes maximum and an incident light beam from the same direction as the hologram construction light beam $L_{21}$ in FIG. 5B is diffracted to an extended line $L_{23}$, as shown by a broken line in FIG. 5B. On the other hand, if the direction of the diffracted incident light beam is perpendicular to the direction of the relief grooves, so-called P-polarization, the intensity of the diffracted light beam becomes minimum and almost all of the incident light beam is transmitted through the surface relief hologram 23.

In the second embodiment, the semiconductor laser source 21 is so arranged that the light beam $L_{13}$ is irradiated therefrom onto the phase hologram 22 at the Bragg angle. The direction $A_4$ of polarization of the light beam $L_{13}$ is parallel to the sheet plane of FIG. 4 and perpendicular to that of the relief grooves of the surface relief hologram 23.

Figure 6:
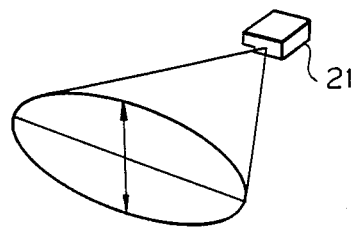
FIG. 6 is a perspective view showing the direction of polarization of the light beam irradiated from a semiconductor laser source.

In this second embodiment, the light beam $L_{13}$ from the semiconductor laser source 21 is largely diffracted, since it is irradiated onto the phase hologram 22 at the Bragg angle, as mentioned above. As the direction $A_4$ of polarization of the light beam $L_{13}$ is the shorter diametrical direction of an ellipse, as shown in FIG. 6, the shorter diameter is enlarged so that the light beam is compensated into a substantially circular shape by passing through the phase hologram 22. The diffracted light beam $L_{14}$ is then irradiated onto the surface relief hologram 23 and almost all is transmitted therethrough, since the direction of polarization thereof is perpendicular to that of the relief grooves. The transmitted light beam is a parallel ray, which is converted to a circularly polarized light when passed through the wave plate 24 and focussed on the optical diskette D by the objective hologram lens 27.

The light beam $L_{15}$ reflected at the optical diskette D is again changed to a parallel ray $L_{16}$ by the objective hologram lens 26 and irradiated onto the surface relief hologram 23 via the wave plate 24. However, the parallel light beam $L_{16}$ has been converted from a circularly polarized light to a linearly polarized light by the wave plate 24, and the direction $A_6$ of polarization is perpendicular to the sheet plane of FIG. 4, which is the same as the direction of the relief grooves of the surface relief hologram 23. Therefore, the parallel light beam $L_{16}$ is largely diffracted by the surface relief hologram 23 and the diffracted light beam $L_{17}$ is irradiated onto the phase hologram 22 at the non-Bragg angle, so that almost all of the light beam is transmitted therethrough and introduced to the optical sensor 25.

Figure 7:
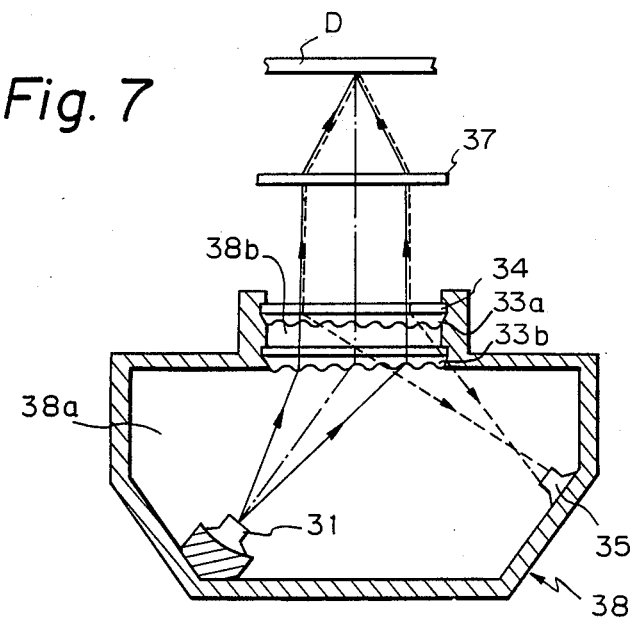
FIG. 7 is an illustration of a third embodiment of an optical system according to the present invention.

FIG. 7 illustrates a third embodiment of an optical system according to the present invention, in which the optical system comprises, a semiconductor laser source 31, two surface relief holograms 33a and 33b, a ($\frac{1}{4}\cdot\lambda$) wave plate 34, an optical sensor 35, and an objective hologram lens 37. One of the surface relief holograms 33a is constructed on the wave plate 34, in the same manner as in the previous embodiments.

In this third embodiment, the light beam from the semiconductor laser source 31 is irradiated onto the surface relief hologram 33b which has a plurality of relief grooves, the direction of which is perpendicular to the polarization of the irradiated light beam. Therefore, the ellipse-shaped light beam is changed to a circular-shaped light beam. In order to diffract the light beam of P-polarization irradiated from the semiconductor laser source 31, $\lambda/d$ (FIG. 8) should be about 0.8, where the central pitch of the relief grooves is d and, of course, the wave length is $\lambda$. That is to say, if the wave length of the beam from the semiconductor laser source 31 is 0.8 $\mu$m, d should be about 1 $\mu$m (the spatial frequency is about 1000/mm). The light beam diffracted by the surface relief hologram 33b is then irradiated onto the other surface relief hologram 33a which is so constructed that $\lambda/d$ is about 1.6, i.e., d is about 0.5 $\mu$m (here, the spatial frequency is about 2000/mm), in order to diffract the light beam only slightly. The light beam thus transmitted through the surface relief hologram 33a passes through the wave plate 34 and the objective hologram lens 37 and is focussed on the optical diskette D. The reflected light beam is again irradiated onto the surface relief hologram 33a as S-polarization and diffracted thereby. Since the diffracted light beam is S-polarization, it is almost all transmitted through the surface relief hologram 33b and directed toward the optical sensor 35. The optical elements including these two holograms 33a and 33b accompanying the wave plate 34, the laser 31, and the optical sensor 35 are accommodated in a single casing structure 38.

Figure 8:
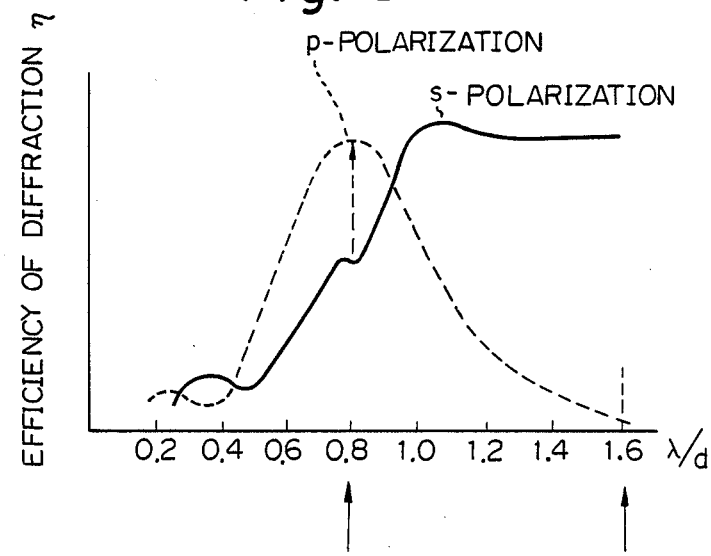
FIG. 8 is a diagram showing the diffraction efficiency in the embodiment shown in FIG. 7.

FIG. 8 shows the relationship between $\lambda/d$ and the efficiency of the diffraction ($\eta$) in the embodiment shown in FIG. 8. When λ/d is 0.8, the efficiency of the diffraction of the P-polarization is increased. On the other hand, when λ/d is 1.6, the efficiency of the diffraction of the S-polarization is enlarged.

Figure 9:
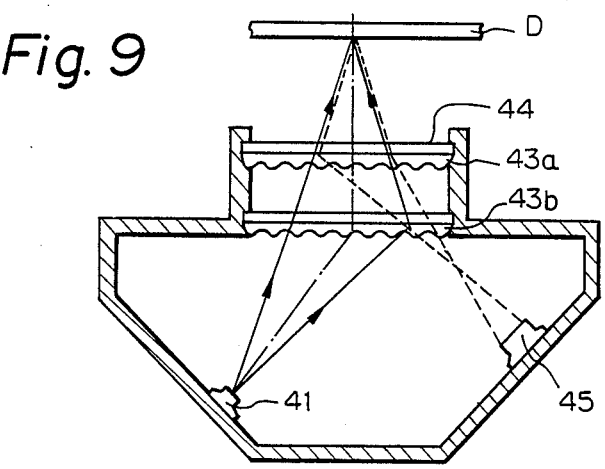
FIG. 9 is an illustration of a fourth embodiment similar to the third embodiment shown in FIG. 7.

FIG. 9 illustrates a fourth embodiment similar to the third embodiment shown in FIG. 7. In this embodiment, the optical system comprises, a semiconductor laser source 41, two surface relief holograms 43a and 43b, a (¼·λ) wave plate 44, and an optical sensor 45. However, an objective hologram lens is omitted and, therefore, one of the surface relief holograms 43a is constructed so as to more largely diffract the light beam irradiated from the semiconductor laser source 41 so as to directly focus it on the optical diskette D.

Figure 10:
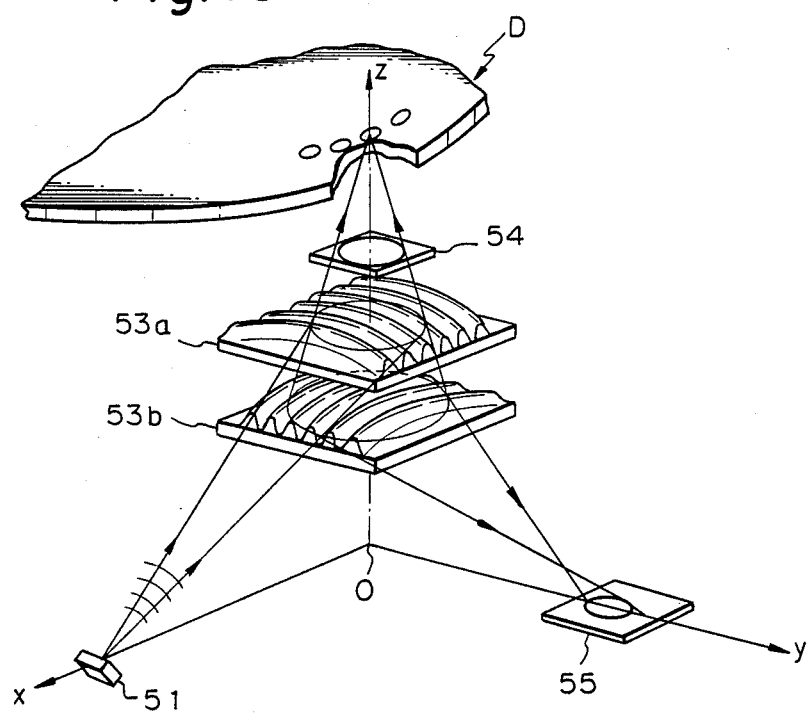
FIG. 10 is a schematic perspective view of a fifth embodiment of an optical system according to the present invention.
Figure 11:
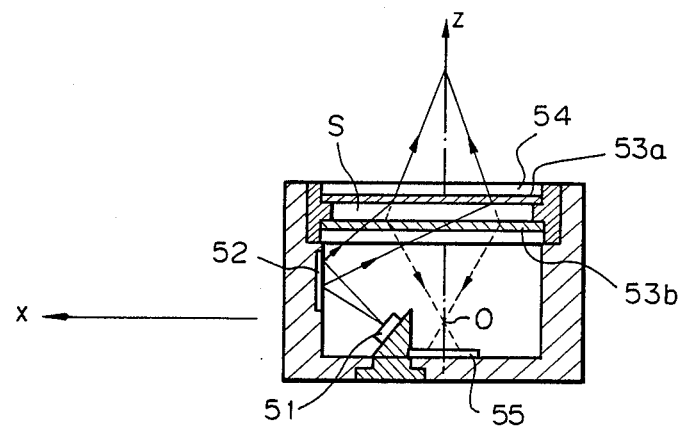
FIG. 11 is a schematic cross-sectional view of a modified embodiment similar to the fifth embodiment shown in FIG. 10.

FIGS. 10 and 11 illustrate a fifth embodiment similar to the previous embodiment shown in FIG. 9. In this embodiment, the optical system comprises, a semiconductor laser source 51, two surface relief holograms 53a and 53b, a (¼·λ) wave plate 54, and an optical sensor 55, in the same manner as in the previous embodiment shown in FIG. 9. However, the two surface relief holograms 53a and 53b are arranged in such a manner that the relief grooves of one of the holograms extend perpendicular with respect to those of the other hologram. Therefore, the laser source 51 and the optical sensor 55 can be arranged on x and y lines, respectively, if the laser beam is irradiated along z line toward the optical diskette D, in the x,y,z-coordinates. Reference numeral 52 in FIG. 11 denotes a flat mirror, arranged in parallel to the y,z-plane in FIG. 10, for reflecting the light beam irradiated from the laser source 51. In this case, therefore, the laser source 51 can be located in the vicinity of the 0-point, i.e., the intersection of the lines x, y, and z. According to the arrangement of the laser source 51 and the optical sensor 55, as shown in FIGS. 10 and 11, the optical pickup can be constructed in a more compact size.

Figure 12:
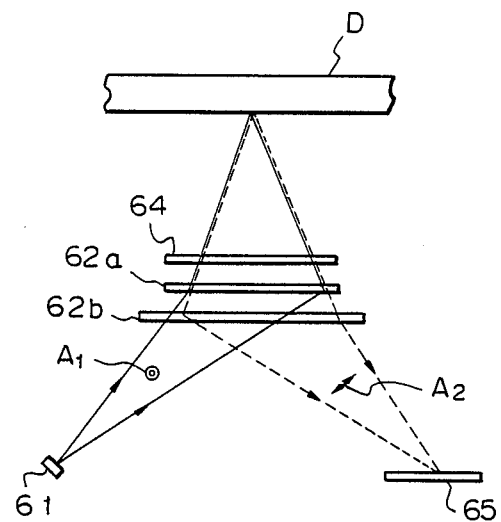
FIG. 12 is a schematic illustration of a sixth embodiment of an optical system according to the present invention.
Figure 13:
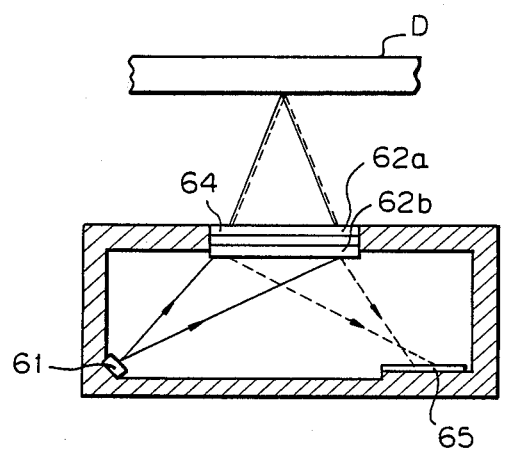
FIG. 13 is a cross-sectional view of the sixth embodiment shown in FIG. 12.

FIGS. 12 and 13 illustrate a sixth embodiment of an optical system according to the present invention, in which the optical system comprises a semiconductor laser source 61, two phase holograms 62a and 62b, a (¼·λ) wave plate 64, and an optical sensor 65. In this sixth embodiment, the light beam from the semiconductor laser source 61 is irradiated onto the phase hologram 62b at the non-Bragg angle, so that almost all of the incident light beam is transmitted therethrough. The direction of polarization is A$_1$, which is perpendicular to the sheet plane of FIG. 12. The light beam is then irradiated onto the other phase hologram 62a. However, because of S-polarization, it is diffracted toward the optical diskette D through the wave plate 64, which converts a linearly polarized light to a circularly polarized light. Thus, a phase hologram can also have the same characteristics as FIG. 3B. When the light beam reflected at the optical diskette D passes through the wave plate 64, it is again converted to a linearly polarized light, the direction of which is A$_2$, perpendicular to the above direction A$_1$, and then irradiated onto the phase hologram 62a, bacause of S-polarization, almost all of the incident light beam is transmitted therethrough. The light beam is then irradiated onto the phase hologram 62b at the Bragg angle. Therefore, the light beam is diffracted thereby and directed to the optical sensor 65.

Figure 14:
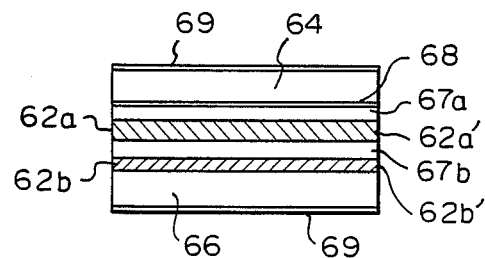
FIG. 14 is a cross-sectional view of a laminated hologram lens used in the sixth embodiment shown in FIGS. 12 and 13.
Figure 15:
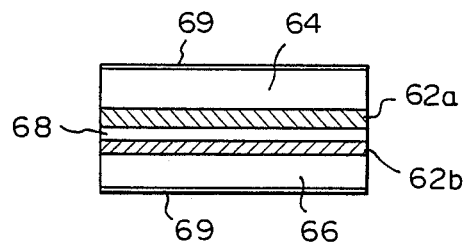
FIG. 15 is a cross-sectional view of another embodiment of the laminated hologram lens.

The two phase holograms 62a and 62b and the wave plate 64 may be laminated as shown in FIG. 13 and constructed as a compact optical module together with the laser source 61 and the optical sensor 65. Embodiments of the laminated phase holograms 62a and 62b and wave plate 64 are illustrated in FIGS. 14 and 15. In FIG. 14; (a) hologram material 62b', such as PVCz, is coated on a transparent substrate 66 to obtain the phase hologram 62b; (b) on which a Si protection film 67b is formed to protect it from the subsequent chemical processes for making the other phase hologram 62a. (c) Hologram material 62a', such as PVCz, is coated on the protection film 67b to obtain in the phase hologram 62a. (d) Si protection film 67a is formed on the phase hologram 62a to protect it and the (¼·λ) wave plate 64 is adhered to the phase hologram 62a via optical adhesion 68. On the surfaces of the substrate 66 and the wave plate 64, reflection protecting films 69 can be coated to reduce the possible optical loss. The thickness of such a laminated holograms almost equals to the sum of thickness of the substrate 66 and the wave plate 64.

In FIG. 15, another embodiment is shown, in which (a) hologram material 62b' is coated on a transparent substrate 66 and hologram material 62a' is directly coated on the (¼·λ) wave plate 64, respectively. (b) Then these two hologram layers are adhered in a face-to-face relationship via an optical adhesion 68. If necessary for the kinds of hologram material, to protect the hologram layers with respect to the adhesion, protection films can be formed on these hologram layers before adhering.

Figure 16:
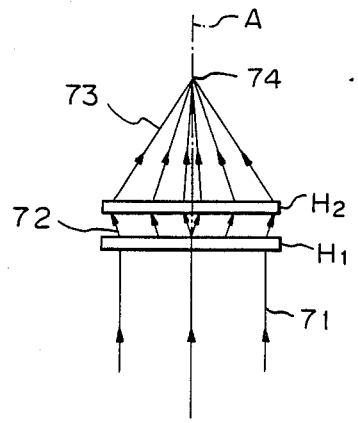
FIG. 16 is a schematic illustration for explaining the principle of an objective hologram lens which can be used in an optical system according to the present invention.

Referring now to FIG. 16, there is illustrated a hologram lens which can be used as the objective hologram lens 27 (FIG. 4) or 37 (FIG. 7). In FIG. 16, H$_1$ denotes a first hologram lens; and H$_2$, a second hologram lens. The first hologram lens H$_1$ is located to face an incident light 71. On the other hand, the second hologram lens H$_2$ is located at the side of a focal point 74. Although the first and second hologram lens H$_1$ and H$_2$ are shown to be separated for only the convenience of explanation, they constitute a laminated structure in the same manner as described with reference to FIGS. 14 and 15. The first hologram lens H$_1$ serves to diffract the incident light beam 71 to the diverging direction with respect to an optical axis A. On the other hand, the second hologram lens H$_2$ serves to diffract the light beam 72 diffracted by the first hologram H$_1$ to the converging direction with respect to the optical axis A.

Therefore, the incident light 71 is diffracted outward when it passes through the first hologram lens H$_1$. Then, diffracted light beam 72 is again diffracted inward when it passes through the second hologram lens H$_2$. The converging light beam 73 is focussed on the focal point 74.

Figure 17A:
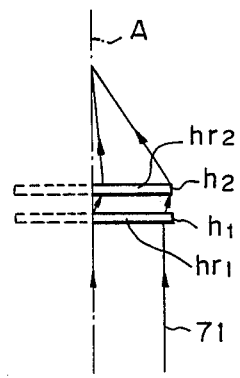
FIGS. 17A, 17B, 17C and 17D are schematic illustrations of a first embodiment of the objective hologram lens.
Figure 17B:
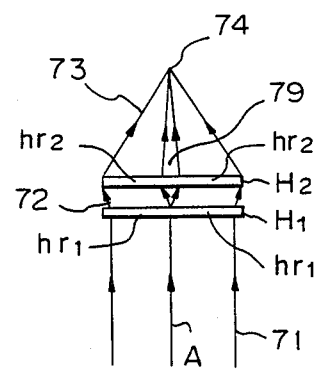

FIGS. 17A, 17B, 17C and 17D illustrate a first embodiment of the objective hologram lens, wherein FIG. 17A shows a right half of the double-structured hologram lens as described above. Two sets of the right halves of double-structured hologram lens are to be prepared, and one of them is turned over 180° C. about the optical axis A and abutted to the other half of hologram lens, as shown in FIG. 17B.

According to the above double-structured hologram lens, the first hologram lens H$_1$ generates plane wave diverging to the periphery, when a symmetrical light beam with respect to the optical axis A, such as plane wave perpendicular to the hologram, is introduced to the first hologram H$_1$. On the other hand, the second hologram lens H$_2$ serves to diffract the light beam 72 diffracted by the first hologram H$_1$ to focus it on the focal point 74. These first and second hologram lens H$_1$ and H$_2$ are adhered to each other by a suitable optical adhesion, such as a type wherein the adhesive is hardened by ultraviolet radiation. Two right halves of the double-structured hologram lens thus made are aligned side by side on a line to make an inline hologram lens having a good property in a reasonable range of spatial frequency.

Figure 17C:
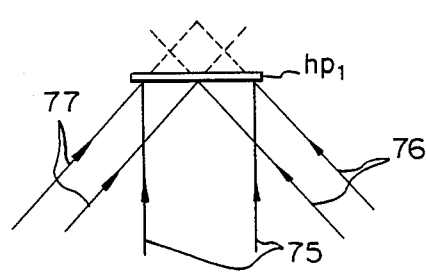
Figure 17D:
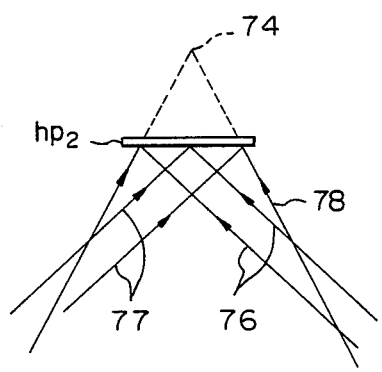

However, since it is difficult in use to precisely form a double-structured hologram lens, as shown in FIG. 17B, from the two semicircular holograms, as shown in FIGS. 17C and 17D. Consequently, a plane wave 75 is irradiated perpendicularly onto the whole plane of the first hologram $H_1$, and plane waves 76 and 77 are irradiated obliquely onto the right half and the left half, respectively, as shown in FIG. 17C, to produce interference fringes. Then, the first hologram $H_1$ is turned inside out and faced to the second hologram $H_2$, to diffract the plane wave outward. On the other hand, as shown in FIG. 17D, a spherical wave 78 is irradiated onto the whole plane of the second hologram $H_2$, and plane waves 76 and 77 are irradiated obliquely onto the right half and the left half, respectively, to produce interference fringes.

Figure 18:
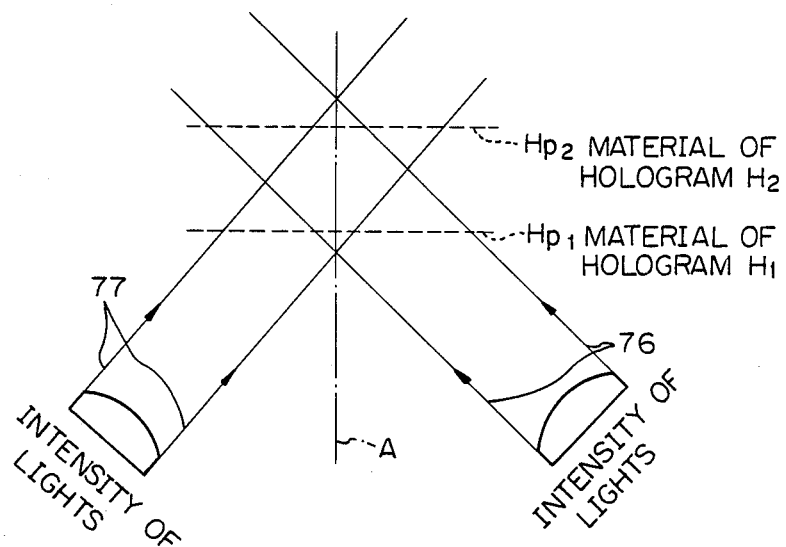
FIG. 18 is a schematic illustration of a second embodiment of the objective hologram lens.

It is also difficult to precisely position these two holograms with respect to each other, in the region indicated by 79 (FIG. 17B) on the optical axis A. To solve these problems, as seen from FIG. 18, the first hologram $H_1$ is made by irradiating two separated plane waves 76 and 77 from the respective directions so as to superimpose these plane waves 76 and 77 around the center of one hologram material $H_{P1}$, thereby two holograms can be precisely and smoothly joined. On the other hand, the second hologram $H_2$ is also made by irradiating these left and right plane waves 76 and 77 so as to superimpose parts of them onto the optical axis A. To prevent a mutual interference by the plane waves 76 and 77 themselves, it is advantageous to use suitable masks and to conduct the optical deposition in two steps.

Figure 23:
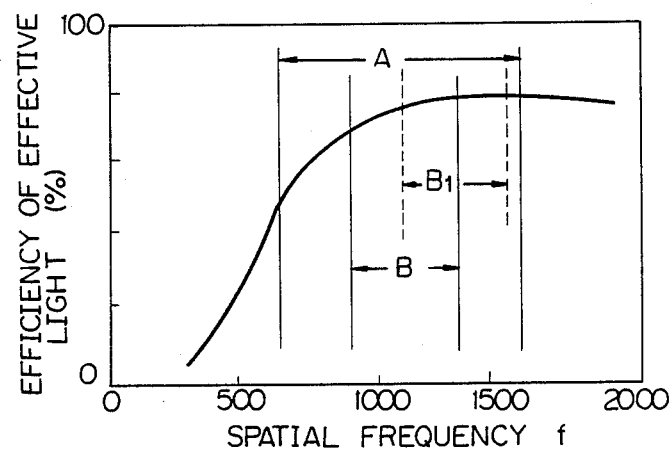
FIG. 23 is a diagram showing the relationship between spatial frequency and optical efficiency.
Figure 24:
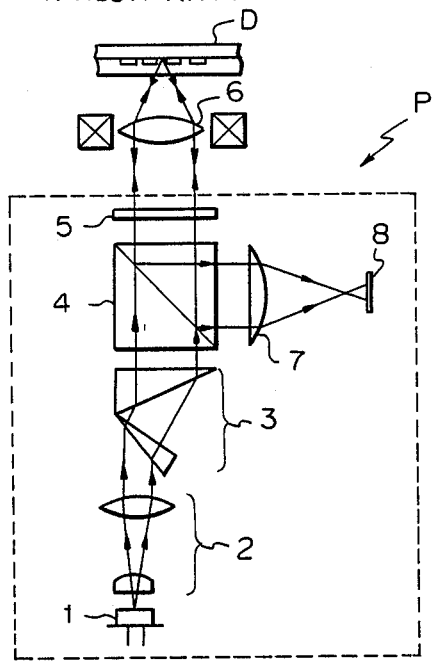
FIG. 24 is a schematic illustration of a conventionally known optical pickup; and, FIG. 25 is a schematic illustration of an access device in a conventionally known optical pickup.
Figure 25:
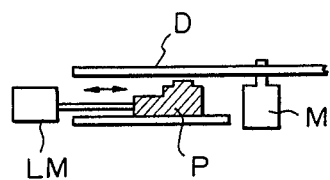

According to the double-structured hologram lens thus made, the range of spatial frequency can be narrowed to about a half of that of a conventional hologram lens, as shown by B in FIG. 23, and thus an improvement of the optical efficiency over the whole area of the hologram can be expected.

FIGS. 19A, 19B, 19C, 19D, and 19E show a third embodiment of the objective hologram lens, in which the optical path is symmetrical with respect to the optical axis A. In this embodiment, the first hologram $H_1$ is constructed so that the interference fringes thereof are such that, if an incident light wave (such as a, plane wave perpendicularly irradiated) which is symmetrical to the optical axis A is applied to the hologram, the light wave is irradiated from circles onto the hologram concentric about the optical axis A and along the slant lines of the concentric circular cones, as seen from FIG. 19A. On the other hand, the second hologram $H_2$ is constructed so that the interference fringes thereof are such that, if an incident light wave is applied thereto along slant lines of circular cones concentric about the optical axis A, the light wave is irradiated therefrom to focus on a point on the optical axis A, as seen from FIG. 19B. These two holograms $H_1$ and $H_2$ are laminated to make a double-structured hologram lens.

Figure 19A:
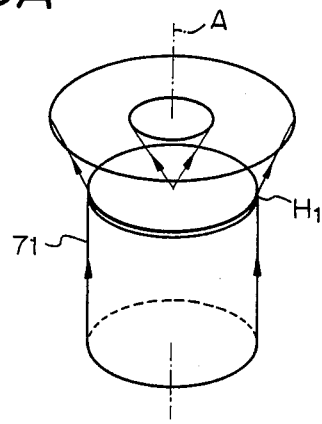
Figure 19B:
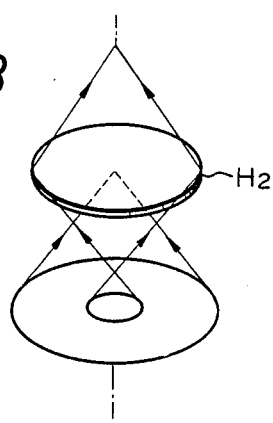
Figure 19E:
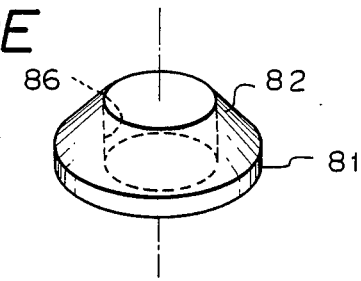
Figure 19C:
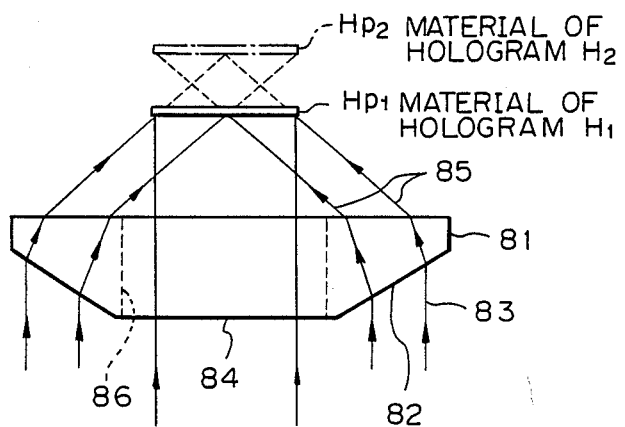
Figure 19D:
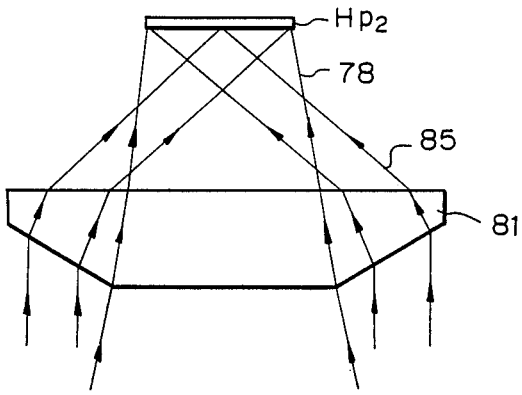

FIGS. 19C and 19D show processes for making these two holograms $H_1$ and $H_2$, respectively, in which reference numeral 81 denotes a transparent optical element having a cone slant face 82, as also shown in FIG. 19E. to construct the first hologram $H_1$. A ring-shaped plane wave 83 is irradiated onto the cone face 82 of the optical element 81 and circular plane wave 84 is also irradiated onto the central plane surface 84. Therefore, the plane wave 83 is diffracted at the respective faces of the optical element 81, so that the inner periphery thereof is focussed on the optical axis A and the outer periphery thereof is focussed on the outer periphery of the hologram material $H_{P1}$ to construct interference fringes functioning as explained with reference to FIG. 19A. On the other hand, to construct the second hologram $H_2$, the hologram material $H_{P2}$ is placed at a retracted position, as shown by a dotted line in FIG. 19C and a solid line in FIG. 19D. A spherical wave 78 is also irradiated onto the plane surface 84, thereby interference fringes functioning as explained with reference to FIG. 19B are formed. The optical element 81 may have a central opening 86 (FIGS. 19C and 19E) for passing through the spherical wave 78.

Figure 20:
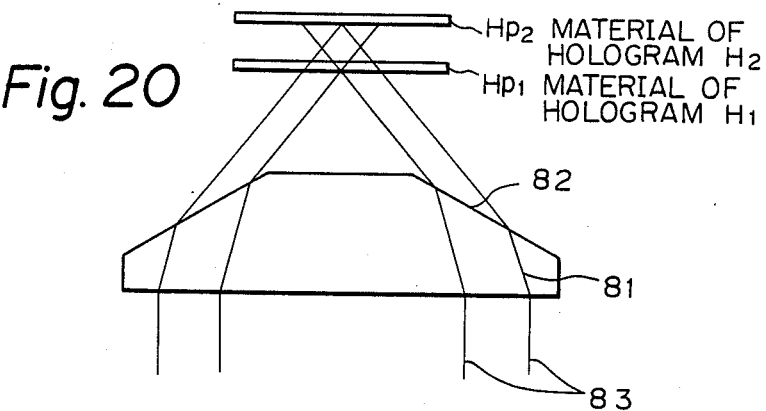
FIG. 20 is a schematic illustration of a fourth embodiment of the objective hologram lens.

FIG. 20 shows a fourth embodiment of a hologram lens, in which the optical element 81 is placed so that the cone slant face 82 thereof faces to the hologram materials. The hologram materials for the first and second holograms $H_1$ and $H_2$ are placed at $H_{P1}$ and $H_{P2}$, respectively, to construct these hologarms $H_1$ and $H_2$.

According to the hologram lens thus made in accordance with the third and fourth embodiments, it is also possible to set a narrow range of spatial frequency, as for B in FIG. 23, and an improvement of the optical efficiency over the whole area of the hologram can be expected. In the above embodiments, it is also possible to shift the spatial frequency from B to B' in FIG. 23. This can be done in the third and fourth embodiments by changing the apex angle of the circular cone formed by the light beams for the two holograms, and in the first and second embodiments, by changing the incident and irradiation angles of the plane wave between the two holograms.

Figure 21A:
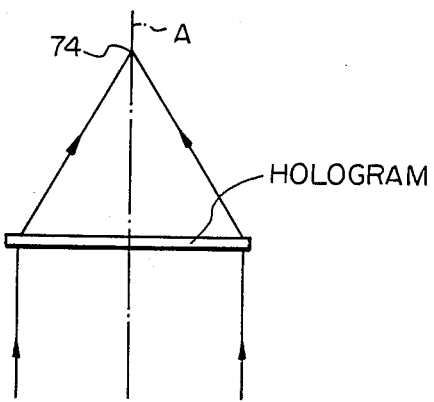
FIGS. 21A and 21B are schematic illustrations of a conventional hologram lens.
Figure 21B:
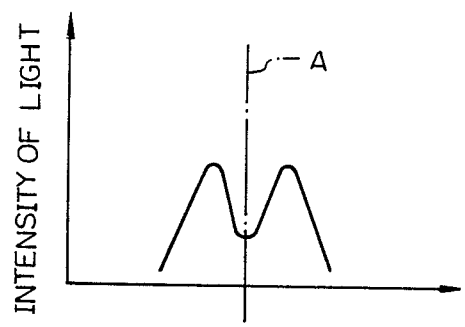
Figure 22A:
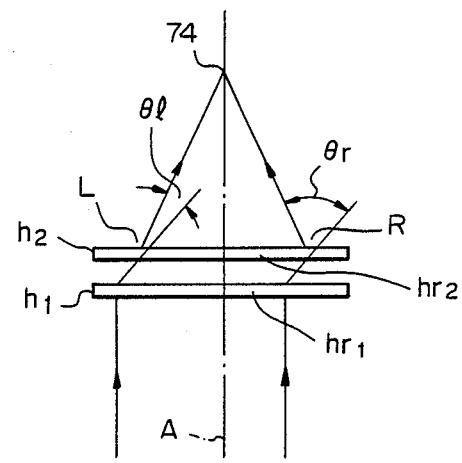
FIGS. 22A and 22B are schematic illustrations of another example of a conventional hologram lens.
Figure 22B:
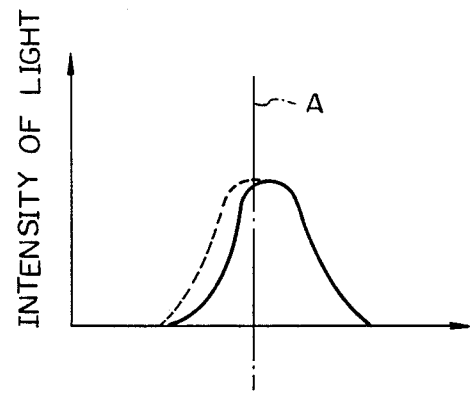

As mentioned above, an inline hologram lens as constructed in accordance with the present invention has a good property of a narrow range of spatial frequency. There is no unevenness in the light intensity, as in a conventional single hologram lens, as shown in FIG. 21B, due to the reduction of the diffraction efficiency, when a regeneration light beam is irradiated as shown in FIG. 21A. In a conventional double-structured hologram lens, as shown in FIG. 22A, the spatial frequency of the interference fringes at the right end R is different from that at the left end L, and the spatial frequency continuously changes. Therefore, a high efficiency of diffraction cannot be obtained at the area near the left end L, since the distribution of light intensity is asymmetrical with respect to the optical axis A, as shown in FIG. 22B. Therefore, the range of spatial frequency is relatively wide, as shown by A in FIG. 23. Conversely, in accordance with the present invention, the hologram lens has a good property of a narrow range of spatial frequency, as seen at B in FIG. 23.

We claim:
1. An optical pickup, comprising:
    a light source irradiating a light beam onto an information recording media;
    an optical sensor detecting the light beam reflected by said information recording media; and
    an optical lens system, having a wave plate through which said light beam passes, comprising:
        a first hologram lens;
        a second hologram lens parallel to said first hologram lens with the light beam irradiated from said light source passing through said first and said second hologram lenses, and said wave plate, reflecting off of said information recording media, and passing again through said wave plate and said second and said first hologram lenses, one of said first and said second hologram lenses diffracting the light beam from said light source toward said information recording media, and the other hologram lens transmitting the same light beam diffracted by the one of said first and second hologram lenses, and said other hologram lens diffracting the reflected light beam from said information recording media toward said optical sensor, and the one of said hologram lenses transmitting the reflected light beam diffracted by said other hologram lens.

2. An optical pickup as set forth in claim 1, wherein said one of said hologram lenses diffracts the light beam from said light source so as to directly focus it on said information recording media.

3. An optical pickup as set forth in claim 1, wherein said other hologram lens diffracts the reflected light beam from said information recording media so as to focus it on said optical sensor.

4. An optical pickup as set forth in claim 1, wherein said light source is a semiconductor laser.

5. An optical pickup as set forth in claim 1, wherein one of said first and said second hologram lenses comprises a phase hologram, which transmits the light beam by irradiating it at a non-Bragg angle and diffracts the light beam by irradiating it at the Bragg angle, and the other of said first and said second hologram lenses comprises a surface relief hologram.

6. An optical pickup as set forth in claim 1, wherein said first and said second hologram lenses comprise phase holograms, one of said hologram lenses adjacent to an optical diskette transmitting or diffracting the light beam by being irradiated at a non-Bragg or Bragg angle, respectively, and the other hologram lens diffracting or transmitting the light beam by being irradiated at the Bragg or non-Bragg angle, respectively, or by P- or S-polarization.

7. An optical pickup as set forth in claim 1, wherein said first and said second hologram lenses comprise surface relief holograms.

8. An optical pickup as set forth in claim 7, wherein said first and said second surface relief hologram lenses have relief grooves, and the relief grooves of the first hologram lens are arranged in parallel to those of the second hologram lens.

9. An optical pickup as set forth in claim 7, wherein said first and said second surface relief hologram lenses have relief grooves, and the relief grooves of the first hologram lens are arranged perpendicular to those of the second hologram lens.

10. An optical pickup as set forth in claim 1, wherein one of said first and said second hologram lenses diffracts the light beam from said light source to a parallel light beam, and said optical lens system further comprises an objective hologram lens for focussing said parallel light beam on said information recording media.

11. An optical pickup, comprising:
a light source irradiating a light beam onto an information recording media, said information recording media reflecting said light beam;
an optical sensor detecting the light beam reflected by said information recording media; and
an optical lens system, having a wave plate through which said light beam passes, comprising:
a first hologram lens;
a second hologram lens parallel to said first hologram lens, one of said first and second hologram lenses diffracting the light beam to a parallel light beam; and
an objective hologram lens for focussing said parallel light beam on said information recording media, comprising a double-structured inline hologram lens including a third hologram lens, having an optical axis, facing said parallel light and a fourth hologram lens located at the side of a focal point of, and parallel with, said first hologram lens, the light beam irradiated from said light source passing through said first and second hologram lenses and said wave plate, reflecting off of said information recording media, and passing again through said wave plate and said second and first hologram lenses, said first and second hologram lens transmitting the light beam from said light source toward said information recording media, and the second hologram lens diffracting the same light beam transmitted by said first hologram lens, and said second hologram lens transmitting the reflected light beam from said information recording media toward said optical sensor, and said first hologram lens diffracting the reflected light beam transmitted by said second hologram lens, said third hologram lens diffracting the incident beam in the diverging direction with respect to said optical axis, and said fourth hologram lens diffracting the light diffracted by said third hologram lens in the converging direction with respect to said optical axis.

* * * * *

UNITED STATES PATENT AND TRADEMARK OFFICE
CERTIFICATE OF CORRECTION

PATENT NO. : 4,824,191

DATED : April 25, 1989

INVENTOR(S) : Kato et al.

It is certified that error appears in the above-identified patent and that said Letters Patent is hereby corrected as shown below:

Col. 6, line 15, "26" should be --27--.

Col. 7, line 59, "bacause" should be --because--.

Signed and Sealed this

Tenth Day of October, 1989

Attest:

DONALD J. QUIGG

Attesting Officer

Commissioner of Patents and Trademarks